(12) United States Patent
Trunde et al.

(10) Patent No.: US 11,314,513 B2
(45) Date of Patent: Apr. 26, 2022

(54) CIRCUIT FOR VERIFYING THE CONTENT OF REGISTERS

(71) Applicant: STMicroelectronics (Grenoble 2) SAS, Grenoble (FR)

(72) Inventors: Gregory Trunde, Grenoble (FR); Denis Dutey, Jarrie (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 17/211,546

(22) Filed: Mar. 24, 2021

(65) Prior Publication Data

US 2021/0318873 A1 Oct. 14, 2021

(30) Foreign Application Priority Data

Apr. 8, 2020 (FR) ...................................... 2003541

(51) Int. Cl.
*G06F 9/30* (2018.01)
*G06F 9/38* (2018.01)
*G06F 11/10* (2006.01)

(52) U.S. Cl.
CPC ...... *G06F 9/30101* (2013.01); *G06F 9/30029* (2013.01); *G06F 9/30105* (2013.01); *G06F 9/384* (2013.01); *G06F 11/10* (2013.01)

(58) Field of Classification Search
CPC ............... G06F 9/30109; G06F 9/3012; G06F 9/30123; G06F 9/30141; G06F 9/3016; G06F 9/30181; G06F 9/3824; G06F 9/3828; G06F 9/3838

See application file for complete search history.

(56) References Cited

U.S. PATENT DOCUMENTS

| | | | |
|---|---|---|---|
| 7,418,582 B1* | 8/2008 | Iacobovici | G06F 9/30043 712/228 |
| 2009/0070554 A1* | 3/2009 | Wang | G06F 9/3851 712/205 |
| 2013/0073921 A1 | 3/2013 | Kamoshida | |
| 2017/0060673 A1 | 3/2017 | Bowman et al. | |

OTHER PUBLICATIONS

Arteris IP, "Unit duplication", Chapter One—Unit duplication—Packet validity check, Qualcomm Technologies, Inc., Arteris od17835v1, Nov. 31, 2018, 3 pages.
Arteris, "Unit duplication," Arteris IP, FlexNoC 3.9.0 Arteris—FlexNoC Resilience Features, Nov. 31, 2018, 3 pages, © 2018 Qualcomm Technologies, Inc.

* cited by examiner

*Primary Examiner* — Corey S Faherty
(74) *Attorney, Agent, or Firm* — Slater Matsil, LLP

(57) ABSTRACT

In accordance with an embodiment, a method verifies contents of a plurality of registers having two first registers, where each of the plurality of registers is configured to store a data word and a verification bit. The method includes determining whether a value of the verification bit of each respective register of the plurality of registers corresponds to the data word of its respective register. The data words stored in the two first registers are selected so that the bits of a same rank of the two first registers include two complementary bits, each bit of a common binary word is associated with a respective register of the plurality of registers, and the value of the verification bit of each respective register depends on the data word of the respective register and the bit of the common binary word associated with the respective register.

19 Claims, 2 Drawing Sheets

CIRCUIT FOR VERIFYING THE CONTENT OF REGISTERS

This application claims the benefit of French Patent Application No. 2003541, filed on Apr. 8, 2020, which application is hereby incorporated herein by reference in its entirety.

TECHNICAL FIELD

The present disclosure generally relates to electronic devices and more particularly, to devices comprising a circuit for verifying the content of registers.

BACKGROUND

A register is a volatile memory location, generally internal to a digital processor. A register is generally used to temporarily store a data word. It may be an instruction (operator), a variable (operand), or a control signal.

For example, in the case of a vehicle, registers may contain information such as a value representative of the closing level of a window, or information relative to the operation of the car (speed, motor temperature, etc.).

It is thus important to make sure that this information is correct and reliable and is not modified incidentally, for example, by cosmic radiations, particularly to ensure the users' security.

SUMMARY

One embodiment provides a device comprising: at least two first registers, each first register containing a data word and a verification bit, and a first circuit configured to determine whether the verification bit of each register corresponds to the data word of said register, the data words of the first registers being selected so that the bits of a same rank of the first registers comprise two complementary bits.

Another embodiment provides a method comprising, for each register among at least two first registers, each first register containing a data word and a verification bit, a step in which a circuit determines whether the verification bit of each register corresponds to the data word of said register, the data words of the first registers being selected so that the bits of a same rank of the first registers comprise two complementary bits.

According to an embodiment, the device comprises at least a second register, each second register containing a data word and a verification bit.

According to an embodiment, the device comprises a second circuit configured to cyclically deliver to the first circuit the content of all the registers one after the others.

According to an embodiment, each verification bit is obtained on writing into the corresponding register by applying a first function to the data word of said register.

According to an embodiment, the first circuit is configured to apply the first function to the data word contained in each register and compare the result with the verification bit contained in said register.

According to an embodiment, a common binary word is associated with all the registers, the common word comprising a bit associated with each register, the value of the verification bit of each register depending on the data word of said register and on the value of the bit of the common word associated with said register.

According to an embodiment, the first function comprises second and third functions, the second function being applied to the result of the third function.

According to an embodiment, each register is coupled to a circuit configured to write into the registers by a third circuit configured to apply the second function, the second function depending on the value of the bit of the common word associated with said register, to the value of the verification bit.

According to an embodiment, the second function is an XOR-type function.

According to an embodiment, if the bit associated with said register has a first value, the third bit is a direct electric connection, and if the bit associated with said register has a second value, the third circuit is an inverter.

According to an embodiment, the first circuit is configured to: apply the inverse function of the second function to the verification bit; apply the first function to the data word contained in said register; and compare the results.

According to an embodiment, the first circuit comprises a fourth circuit configured to apply the third function to the data word contained in the register, a fifth circuit configured to apply an XOR-type function receiving as an input the verification bit of the register and the bit of the common word associated with the register, and a sixth circuit configured to apply an XOR-type function receiving as an input the output of the fourth circuit and the output of the fifth circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
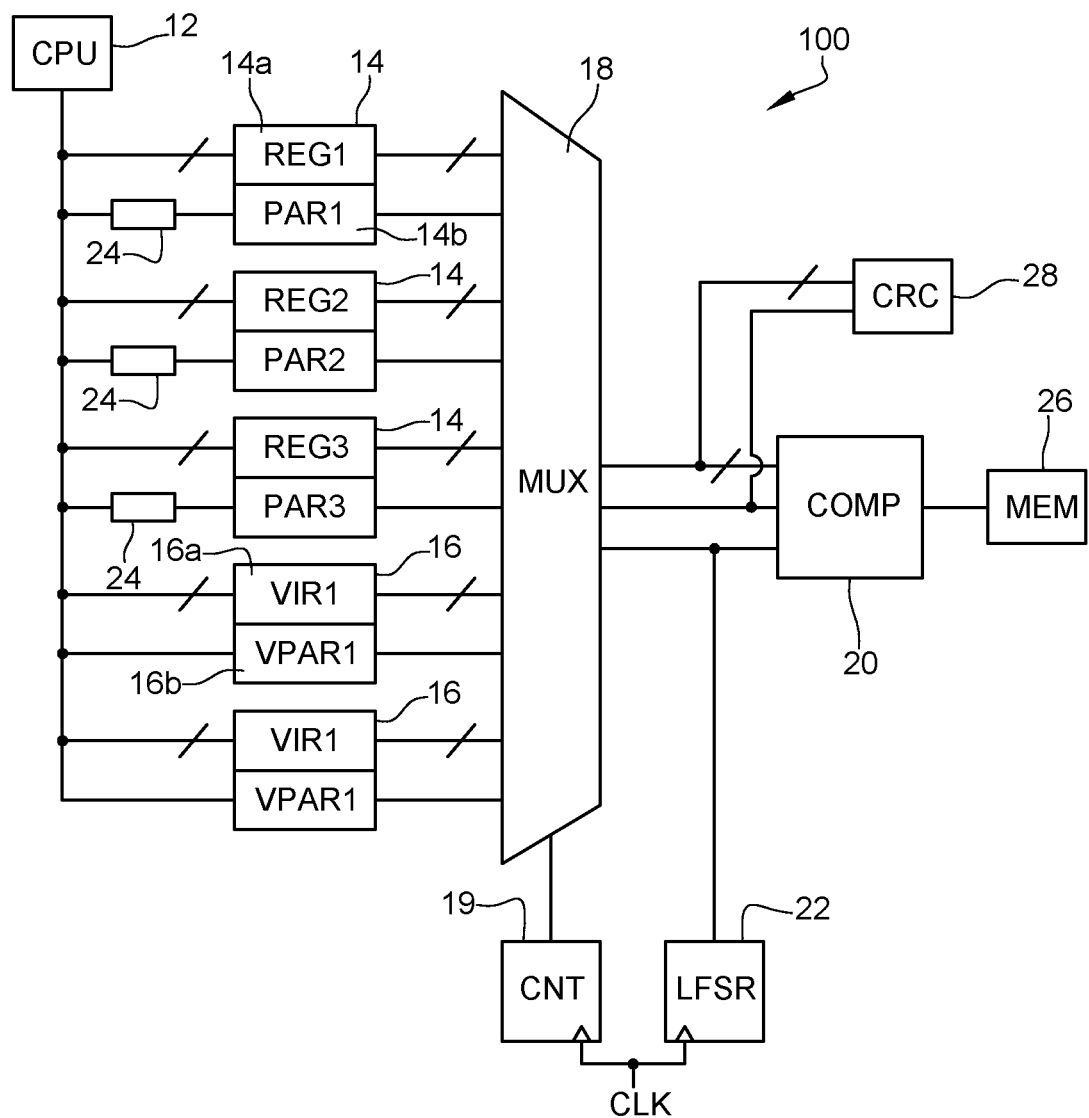
FIG. 1 schematically and partially illustrates an embodiment of an electronic device comprising a circuit for verifying the content of registers.

FIG. 1 schematically and partially illustrates an embodiment of an electronic device wo comprising a circuit for verifying the content of registers. Device wo is for example a vehicle control system.

According to an embodiment, device wo comprises verification registers 16. Registers 16 are registers dedicated to the verification process and its content has no impact upon the functions controlled by device wo. Device wo comprises at least two verification registers 16, preferably exactly two registers 16, as shown in FIG. 1.

Each register 16 comprises a first portion 16a having a binary word VIR1, VIR2 stored therein. For example, each word VIR1, VIR2 has a size greater than or equal to 8 bits, for example, equal to 32 bits.

Preferably, binary words VIR1, VIR2 do not change value during the operation of device 100, and form, in a way, reference words.

The binary words of registers 16 are preferably selected so that each location of first portion 16a has, in at least one of binary words VIR1, VIR2, all possible values. In other words, the binary words of registers 16 are selected so that the bits of a same rank of registers 16 comprise at least two complementary bits.

Thus, a bit of each location, or of each rank, of the first portions 16a has value '1' in at least one of verification registers 16 and has value '0' in at least one of verification registers 16.

For example, one of registers 16 contains, in first portion 16a, a word entirely formed of '0's and another register 16 contains, in first portion 16a, a word entirely formed of '1's.

Preferably, one of registers 16 contains, in first portion 16a, an alternation of '1's and of '0's, starting with a '0', and another one of registers 16 contains, in first portion 16a, an alternation of '1's and of '0's, starting with a '1'.

Each register 16 comprises a second portion 10, having a verification bit VPAR1, VPAR2, for example, a parity bit, stored therein.

Each verification bit VPAR1, VPAR2, is obtained by applying a function f to the binary word written into the first portion of the corresponding register. Function f for example comprises a first function f1 applied to the data words that we wish to store in the registers and a second function f2 applied to the result of the function f1.

Function f1 is for example a usual function enabling to obtain a verification bit from a data word. For example, function f1 is a function enabling to obtain a parity bit. According to another example, function f1 is an error correction code (for example, a Hamming code), a signature function or, more generally, any function having its result depending on the states of the bits of the data word.

The information contained in registers 16, that is, data words VIR1, VIR2 and verification bits VPAR1, VPAR2, is preferably hard coded, meaning fixed, in an immutable way, during the formation of the device.

Device 100 further comprises a central processing unit (CPU) 12 or processor 12. Unit 12 is for example configured to control functions, not shown, of device 100.

Device 100 further comprises at least one register 14. Three registers 14 are shown in FIG. 1.

Each register 14 comprises a first portion 14a having a data word REG1, REG2, REG3 stored therein. Each data word REG1, REG2, REG3 forms a piece of information stored in the register. Each data word forms a piece of information which is desired to be verified. Each data word REG1, REG2, REG3 is a binary word. For example, each data word has a size greater than or equal to 8 bits, for example, equal to 32 bits. Preferably, data words REG1, REG2, REG3 all have the same size. Preferably, the binary words VIR1, VIR2 of registers 16 have the same size as the data words of registers 14.

Each register 14 comprises a second portion 14b, having a verification bit PAR1, PAR2, PAR3, for example, a parity bit, stored therein.

The verification bits are generally obtained by applying the function f to the data words which are desired to be stored into the registers.

The function f, meaning the combination of functions f1 et f2, is for example applied by logic circuits. For example, the functions f1 and f2 are applied by a same circuit 24. For example, one circuit 24 is coupled between each register 14 and the unit 12.

Alternatively, function f is for example applied by unit 12 to the data words which are desired to be stored into the registers.

Thus, during the writing into one of registers 14, unit 12 for example provides the data word to the circuit 24 associated to the register and the circuit 24 applies function f1, then function f2, to the data word. The result of function f2 is the verification bit and is written into the second portion 14b of said register. Parallelly, the data word is written, preferably without modification, in the first part of the register.

According to an embodiment, the information contained in registers 14, that is, data words REG1, REG2, REG3 and verification bits PAR1, PAR2, PAR3, is at least partially generated and written into registers 14 by unit 12. The content of the registers is for example written based on the content of a non-volatile memory or is generated by a circuit, not shown.

A common binary word is associated with the assembly formed by registers 14 and 16 of device 100. The binary word preferably comprises at least as many bits as device 100 comprises registers 14 and 16. Each register 14 and 16 is associated with a bit of the common word. In the example of FIG. 1, the common word comprises 5 bits, the bits being respectively associated with registers REG1, REG2, REG3, VIR1, and VIR2. The common word is for example quasi-random. The common word is for example continuously generated or delivered by a circuit 22. Circuit 22 is for example a linear feedback shift register (LSFR). The common word comprises at least one value '1' and at least one value '0'. The common word is thus not entirely formed of bits having the same value.

Device 100 comprises an error detection circuit (COMP) 20. Preferably, the device 100 comprises a unique error detection circuit 20. The contents of the registers 14 and 16 are therefore checked by a same circuit 20.

The contents of registers 14 and 16 are successively delivered to circuit 20 via a circuit 18 (MUX). Circuit 18 is for example a multiplexer. Circuit 18 is coupled, preferably connected, at its input to all registers 14 and 16. Circuit 18 is coupled, preferably connected, at its output to circuit 20. Circuit 18 for example comprises an output having the data word of the selected register delivered thereto, and another output having the bit contained in the second portion of the selected register delivered thereto. This information, that is, the data word and the verification bit, is delivered to circuit 20 in order to be verified.

Circuit 18 is also coupled, preferably connected, at its input to a circuit 19 (CNT). Circuit 19 is configured to deliver a control signal to circuit 18 determining to which register the content to be delivered to circuit 20 belongs. Circuit 19 receives as an input a clock signal CLK. Circuit 19 is for example a counter. Circuit 19 is configured so that the content of all registers is cyclically delivered to circuit 20.

The registers are associated with the bits of the common word in the same order as that in which the contents of the registers are transmitted to circuit 20 by the circuit 18.

Circuit 22 is synchronized by the same clock signal CLK as circuit 19. Thus, circuit 19 delivers the signal controlling the transfer of the content of one of the registers and circuit 22 delivers the bit of the common word corresponding to this register before the delivery of a signal controlling the transfer of the content of the next register, for example, during a same edge of signal CLK.

The function f2 of each circuit 24, or the result of function f2, depends on the value of the bit of the common word associated with the register corresponding to said circuit 24. The value contained in the second portion of each register is thus representative of the data word and of the associated bit of the common word. For example, function f2 corresponds to a first operation if the bit of the common word has a first value and corresponds to a second operation if the bit of the common word has a second value. For example, if the bit of the common word has the first value, function f2 is the identity function, that is, the result of function f2 is equal to the result of function f1, and if the bit of the common word has the second value, function f2 is the inverse function, that is, the result of function f2 is the inverse, or the complementary, of the result of function f1. The inverse of a bit of value '1' is a bit of value '0' and the inverse of a bit of value '0' is a bit of value '1'.

In other words, function f2 for example corresponds to an XOR-type function applied to the associated bit of the common word and to the value resulting from function f1.

Function f2 has an inverse function f2'. The values to which the functions are applied being binary values, the function f2' is the complementary function, in other words the function according to which:

$$f2'(0) = \overline{f2}(0) = 1$$

$$f2'(1) = \overline{f2}(1) = 0$$

Thus, the result of function f2' applied to the result of function f2 is the value (x) to which the function is applied. The application of the function f2' to the function f2 corresponds to the identity function, in other word to $f2'(f2(x)) = x$.

Preferably, the common word is known on manufacturing of device 100. Circuits 24 may then be different according to the value associated with each register, and thus the function f2. For example, if the bit associated with a register has the first value, the corresponding circuit 24 is a circuit outputting the same binary value as at the input, for example, an electric connection, and if the bit associated with a register has the second value, the corresponding circuit 24 is an inverter.

According to certain standards, for example, the ISO 26262 standard concerning the functional security of road vehicles, the register verification comprises two levels. A first level corresponds to the verification of the content of the registers. A second level corresponds to the verification of the operation of the verification elements. Indeed, if the data word is correct but the error detection circuit comprises faults, an error may be wrongly detected. In another situation, more problematical, if the data word comprises a fault, for example, caused by a cosmic radiation, and the detection circuit comprises a complementary fault, the two faults may compensate for each other. The error in the data word would thus not be detected. It is thus important to be able to detect faults, whether or not they originate from one of the other of the levels.

Figure 2:
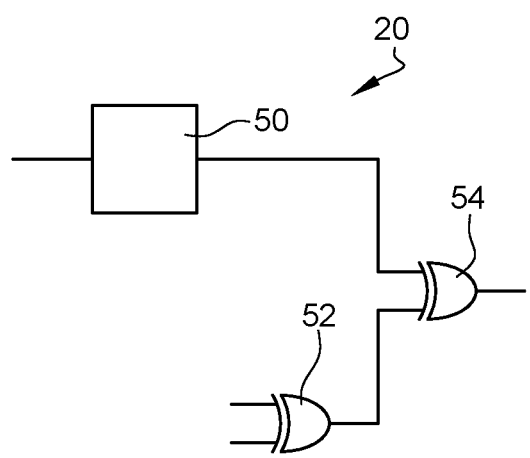
FIG. 2 shows in further detail a portion of FIG. 1.

An example of circuit 20 is shown in further detail in FIG. 2. Circuit 20 is coupled, preferably connected, at its input to the outputs of circuit 18 and to circuit 22. Circuit 20 is for example coupled, preferably connected, at its output to a memory 26 (MEM).

Circuit 20 is configured, when its receives the content of the first and second portions of a register 14 or 16, via circuit 18, and the bit of the common word associated with said register, by circuit 22, to:

a') apply function f1 to the content of the first portion of the register, b') apply function f2' to the content of the second portion of the register, function f2' depending on the bit of the common word associated with the register, and c') compare the results of steps a') and b').

Steps a') and b') are for example carried out in parallel.

If the result of step c') indicates that the results are identical, in other words, if the verification bit corresponds to the data word, an output signal of circuit 20 takes a first value. If the result of step c') indicates that the results are different, in other words, if the verification bit does not correspond to the data word, an output signal of the comparator takes a second value. The first value of the output signal indicates that the data word corresponds to the stored word and thus that the stored information is correct. The second value of the output signal indicates that the data word does not correspond to the desired original value, and that there thus is an error.

Thus, during the operation of device 100, circuit 19 delivers, at a first time, a signal associated with one of registers 14 or 16 to circuit 18. Circuit 18 obtains the content of the first and second portions of this register, for example, data word REG1 and verification bit PAR1. This content is delivered at the output of circuit 18. Circuit 20 thus receives as an input the content of the first and second portions of the register. Circuit 20 further receives at its input the bit of the common word associated with said register. Circuit 20 carries out the previously-described steps a'), b'), and c'). The output signal generated by circuit 20 enables to determine whether the data word of said register is correct. If not, the system integrating the device takes measures adapted to the case of invalid data not to be taken into account. For example, the system is reset, put in a downgraded mode, etc.

At a second time, circuit 19 delivers to circuit 18 a signal associated with a next register 14 or 16. Circuit 18 obtains the content of the first and second portions of the register, for example, data word REG2 and verification bit PAR2. An output signal of circuit 20 is generated in the same way as in the case of the previous register. The second time is preferably sufficiently distant from the first time for the output signal of circuit 20 associated with the first register to be generated before the second time. The second instant corresponds for example to an edge, for example a rising edge, of the clock signal CLK following the first instant.

Similarly, the same verification method is applied to all registers, one after the others. For example, the verification method is applied to the following register during each edge, for example rising edge, of the clock signal. Thus, a register is checked at each clock cycle. Once all registers have been verified, the method is carried out again on the first register. The content of the registers is thus continuously verified.

The application of the method of verification of each register is preferably fast. The duration between the verification of two successive registers is for example shorter than 200 ms, preferably shorter than 50 ms. Preferably, the duration between the verification of two successive registers is such that all registers may be verified within a fault tolerance time interval. For example this time interval is 200 ms, which corresponds to the requirements of the ISO 26262 standard.

The continuous verification of the registers, in particular of registers 14, enables to determine the presence of errors which would have appeared in the data words on writing of the word or during the storage.

The verification of the content of registers 16 enables to determine whether the circuits located downstream of the registers, that is, on the path between the registers and circuit 20, operate properly, which corresponds to the second verification level. For example, the verification of registers 16 enables to determine the presence of latent faults in the circuits downstream of the registers. The term latent faults for example means that the circuits, or one of the connections over which the content of the registers is transmitted, do not properly transmit one or a plurality of bits. For example, a latent fault in circuit 18 may cause to the output signals to always have one bit, for example, the third bit, at a same value, for example, value '0'. Thus, in this example, whatever the transmitted word, the third bit of the word received by circuit 20 has value '0'.

Given that each bit of the reference word to be transmitted has value '1' in a register 16 and value '0' in another register 16, it is possible to determine whether a bit of the reference bit is blocked at a same value.

For example, the case where the bit of a given rank of a first register 16 has value '1' and the bit of same rank of a second register 16 has value '0' is considered. If an error in the device causes, on transfer of the content of the registers to circuit 20, the bit of this rank to still have value '1', circuit 20 will detect, on verification of second register 16, that the value of the bit of the given rank does not have value '0', but has value '1'. If an error in the device causes, on transfer of the content of the registers to circuit 20, the bit of this rank to still have value '0', circuit 20 will detect, on verification of first register 16, that the value of the bit of the given rank does not have value '1', but has value '0'.

On detection of an error, circuit 19 may for example deliver the value of the control signal of circuit 18, for example, to unit 12. It is thus possible to know in which register the error has appeared. The reaction of device 100 on detection of an error may for example be different according to the register where the error has been detected.

The use of the common word in the verification of the content enables to ascertain that circuits 18, 19, and 22 operate properly and that all the registers 14 and 16 are verified in the provided order. Indeed, circuits 19 and 22 are configured to respectively generate the control signal of circuit 18 corresponding to a register and the bit of the common word corresponding to this register, so that circuit 20 can use the bit of the common word associated with the register to verify the content of the register.

Circuits 18, 19, and 22 might not operate properly. For example, circuit 19 might skip a value. In other words, circuit 18 might not transfer the content of one of the registers in the cycle. The register having its content transferred to circuit 20 would thus not correspond to the bit of the common word delivered by circuit 22. There thus would be an offset between the transferred contents and the bits of the common word delivered to circuit 20. If the two successive bits of the common word are equal, this would not be detected. However, if the two successive bits of the common word are different, circuit 20 would detect an error.

For example, it is considered that the common word associated with registers 14 and 16 of FIG. 2 is 00110. Thus, the bits of the common word associated with the first, second, third, fourth, and fifth registers, respectively containing words REG1, REG2, REG3, VIR1, VIR2, respectively have values '0', '0', '1', '1', '0'. It is further considered that, erroneously, circuit 19 does not deliver the signal controlling the transfer of the content of the first register, but delivers the signal controlling the transfer of the content of the second register. Thus, circuit 20 receives the content of the second register and the bit of the common word of the first register. Since the bits of the common word associated with the first and second registers are equal, this error is not detected. Hereafter, circuit 19 delivers the signal controlling the transfer of the content of the next register, that is, the third register, to circuit 20. Circuit 22 delivers to circuit 20 the next bit of the common word, that is, the bit associated with the second register. Circuit 20 thus receives the content of the third register and the bit of the common word associated with the second register. Since the bits of the common word associated with the second and third registers are different, circuit 20 detects an error.

According to an embodiment, the bits of the common word associated with the verification registers are equal, preferably equal to the value for which function f2 is the identity function. Each verification bit VPAR1, VPAR2 is then obtained by applying function f1 to the binary word written into the first portion 16a of the register. Function f2 is not applied. Thus, second portions 16b are not coupled to unit 12 by circuits 24.

The device 100 as described can easily be associated with other elements of data verification. For example, the circuit 100 can comprise a circuit 28 (CRC, FIG. 1) configured to detect transmission or transfer mistakes. Circuit 28 is for example a cyclic redundancy check.

FIG. 2 shows in further detail a portion of FIG. 1.

Circuit 20 comprises a circuit 50 configured to apply function f1. Circuit 50 receives as an input the content of the first portion 14a or 16a of register 14 or 16. For example, circuit 50 performs a bit-to-bit sum of the bits of the data word, for example, with circuits applying XOR-type functions.

Circuit 20 further comprises a circuit 52 applying function f2', depending on the bit of the common word. Circuit 52 receives as an input the verification bit of said register and the bit of the common word associated to said register. For example, the circuit is an XOR gate. Thus, if the bit of the common word has the first value ('0'), function f2' is the identity function, and the output has the value of the verification bit. If the bit of the common word has the second value ('1'), function f2' is the inverse function or the complementary function.

Circuit 20 comprises a circuit 54 configured to determine whether the outputs of circuits 50 and 52 are identical or not. Circuit 54 is for example a circuit applying an XOR-type function. Circuit 54 is for example an XOR-type logic gate.

An advantage of the described embodiments is that they allow the detection of errors in the content of the registers and in the operation of the verification components.

Another advantage of the described embodiments is that they enable to ascertain that all registers have been verified.

Another advantage of the described embodiments is that they comprise a single error detection circuit 20 for all registers 14 and 16. In some embodiments, all or part of the disadvantages of known circuits for verifying the content of registers are addressed or mitigated.

Various embodiments and variants have been described. Those skilled in the art will understand that certain features of these embodiments can be combined and other variants will readily occur to those skilled in the art.

Finally, the practical implementation of the described embodiments and variations is within the abilities of those skilled in the art based on the functional indications given hereinabove.

What is claimed is:

1. A device comprising:
a plurality of registers comprising two first registers, each of the plurality of registers configured to store a data word and a verification bit;
a first circuit configured to determine whether the verification bit of each respective register of the plurality of registers corresponds to the data word of its respective register, wherein the data words stored in the two first registers are selected so that the bits of a same rank of the two first registers comprise two complementary bits; and
a common word circuit coupled to the first circuit, the common word circuit configured to output a common binary word, wherein each bit of the common binary word is associated with a respective register of the plurality of registers, and a value of the verification bit of each respective register depends on the data word of the respective register and the bit of the common binary word associated with the respective register.

2. The device according to claim 1, wherein the plurality of registers further comprises at least one second register.

3. The device according to claim 2, further comprising a second circuit having inputs coupled to outputs of the plurality of registers and an output coupled to the first circuit, wherein the second circuit is configured to cyclically couple the output of each register of the plurality to an input of the first circuit.

4. The device according to claim 3, wherein the second circuit comprises a multiplexer.

5. The device according to claim 3, wherein the value of the verification bit of each respective register is based on applying a first function to the data word of its respective register.

6. The device according to claim 5, wherein the first circuit comprises:
a function verification circuit configured to determine whether the verification bit of the respective register is related to the data word of the respective register according to the first function.

7. The device according to claim 6, wherein the first function comprises a third function of the data word of the respective register, a second function of a result of the third function and the bit of the common binary word associated with the respective register.

8. The device according to claim 7, wherein the function verification circuit comprises:
a second function circuit configured to apply the third function to the data word of the respective register to produce a first value;
a third function circuit configured to apply an inverse of the second function to the verification bit of the respective register to produce a second value; and
a comparator having inputs coupled to an output of the second function circuit and an output of the third function circuit.

9. The device according to claim 7, further comprising a third circuit coupled to an input of the at least one second register, the third circuit configured to apply the second function and the third function to the data word of the at last one second register.

10. The device according to claim 7, wherein the third function is a parity function applied to the data word of the respective register, and the second function is an XOR function applied a result of the parity function and the bit of the common binary word associated with the respective register.

11. The device according to claim 2, wherein the data words of the two first registers are permanently stored, and the at least one second register is writable.

12. A method of verifying contents of a plurality of registers comprising two first registers, each of the plurality of registers configured to store a data word and a verification bit, the method comprising:
determining whether a value of the verification bit of each respective register of the plurality of registers corresponds to the data word of its respective register, wherein the data words stored in the two first registers are selected so that the bits of a same rank of the two first registers comprise two complementary bits, each bit of a common binary word is associated with a respective register of the plurality of registers, and the value of the verification bit of each respective register depends on the data word of the respective register and the bit of the common binary word associated with the respective register.

13. The method according to claim 12, wherein the plurality of registers further comprises at least one second register.

14. The method according to claim 13, wherein determining whether the value of the verification bit of each respective register of the plurality of registers corresponds to the data word of its respective register is cyclically performed on each of the plurality of registers.

15. The method according to claim 13, wherein the value of the verification bit of each respective register is based on applying a first function to the data word of its respective register.

16. The method according to claim 15, wherein the first function comprises a third function of the data word of the respective register, and third function applied to a result of the second function and the bit of the common binary word associated with the respective register.

17. The method of claim 16, further comprising determining whether the value of verification bit of each respective register of the plurality of registers corresponds to the data word of its respective register comprises:
applying the third function to the data word of the respective register to produce a first value;
applying an inverse of the second function the verification bit of the respective register to produce a second value; and
comparing the first value with the second value.

18. The method of claim 16, wherein the second function is an XOR function, and the third function is a parity function.

19. The method of claim 16, further comprising:
applying the first function to a first data word value and a bit of the common binary word associated with the at least one second register to produce a verification bit value; and writing a first data word and the verification bit value to the at least one second register.

* * * * *